United States Patent
Srinivasan

(10) Patent No.: US 8,208,543 B2
(45) Date of Patent: Jun. 26, 2012

(54) QUANTIZATION AND DIFFERENTIAL CODING OF ALPHA IMAGE DATA

(75) Inventor: Sridhar Srinivasan, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 1073 days.

(21) Appl. No.: 12/123,319

(22) Filed: May 19, 2008

(65) Prior Publication Data

US 2009/0284651 A1   Nov. 19, 2009

(51) Int. Cl.
*H04B 1/66* (2006.01)

(52) U.S. Cl. ............. 375/240.12; 375/240.08; 382/232; 382/244; 382/252

(58) Field of Classification Search ............. 375/240.12, 375/240.28; 382/232, 244, 251, 252
See application file for complete search history.

(56) References Cited

U.S. PATENT DOCUMENTS

| | | | |
|---|---|---|---|
| 5,761,341 A | 6/1998 | Go | |
| 5,764,374 A * | 6/1998 | Seroussi et al. | 382/244 |
| 5,864,342 A | 1/1999 | Kajiya | |
| 6,263,022 B1 | 7/2001 | Chen et al. | |
| 6,356,666 B1 | 3/2002 | Atsumi et al. | |
| 6,577,679 B1 * | 6/2003 | Apostolopoulos | 375/240.12 |
| 7,215,709 B2 | 5/2007 | Yamaguchi | |
| 2005/0196062 A1 | 9/2005 | Cho | |
| 2006/0103660 A1 | 5/2006 | Maynard et al. | |
| 2007/0127812 A1 | 6/2007 | Strom | |
| 2008/0024513 A1 * | 1/2008 | Raveendran | 345/589 |

OTHER PUBLICATIONS

Aghito et al., "Context Based Coding of Quantized Alpha Planes for Video Objects," *2002 IEEE Workshop on Multimedia Signal Processing*, Dec. 2002, pp. 101-104.
Chen et al., "a-Channel Compression in Video Coding," *Proceedings of the 1997 International Conference on Image Processing*, Oct. 1997, pp. 500-503.
Etoh et al., "Template-Based Video Coding with Opacity Representation," *IEEE Transactions on Circuits and Systems for Video Technology*, Feb. 1997, pp. 172-180.
Rost et al., "An Edge Preserving Differential Image Coding Scheme," *IEEE Transactions on Image Processing*, Apr. 1992, pp. 250-256.

\* cited by examiner

*Primary Examiner* — Hassan Kizou
*Assistant Examiner* — Emmanuel Maglo
(74) *Attorney, Agent, or Firm* — Klarquist Sparkman, LLP

(57) ABSTRACT

Alpha images are efficiently encoded for inclusion in video bitstreams. During encoding, alpha image data is quantized as a first step before differential encoding. The quantized alpha image data is then differential encoded and represented in a modulo domain before entropy encoding to take advantage of certain distribution features of typical alpha image data. During decoding, a decoder performs differential decoding of encoded alpha image data before dequantization. During differential decoding, the data is converted from a modulo domain to a continuous domain. Dequantization is performed using a technique which results in reconstructed alpha image values which include 0 and maximal values within the acceptable alpha image data range so that the process preserves these values for reconstructed alpha images.

20 Claims, 10 Drawing Sheets

Example alpha image (closeup) 110

Example alpha image 100

Alpha Image Histograms

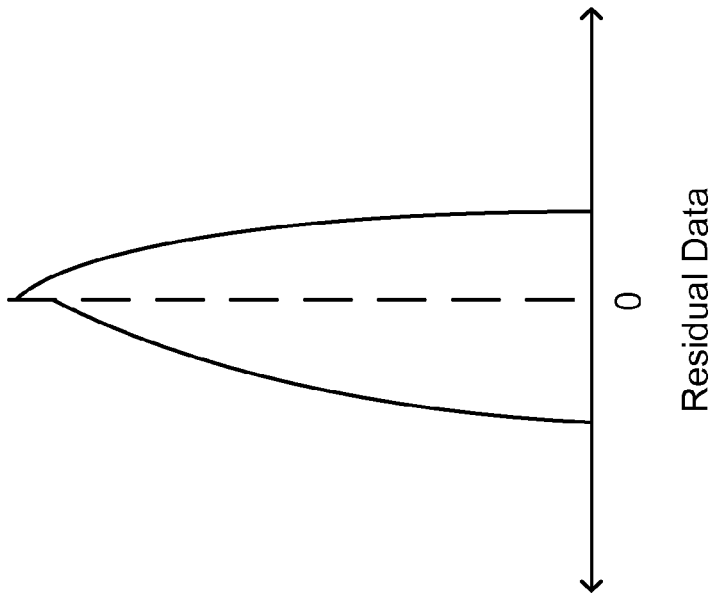
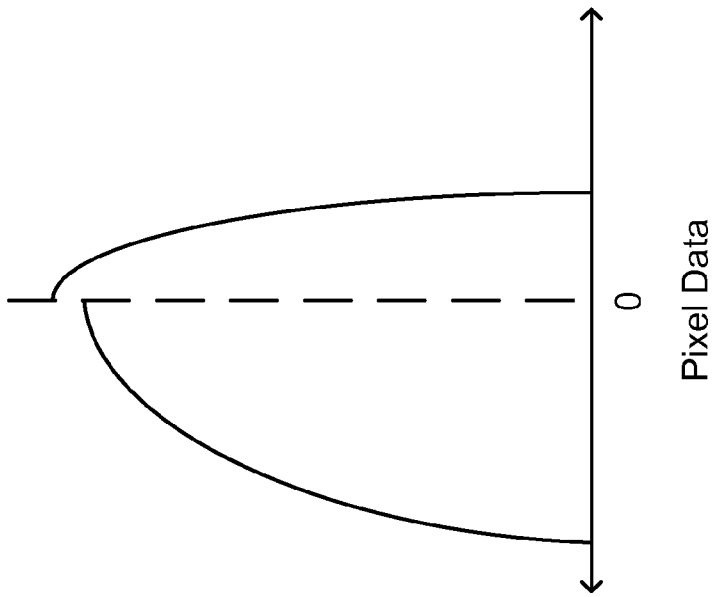
Fig. 3a
Fig. 3b
Alpha Image Histograms in Modulo Domain software 1080 implementing one or more alpha image coding innovations

QUANTIZATION AND DIFFERENTIAL CODING OF ALPHA IMAGE DATA

BACKGROUND

Alpha images are two-dimensional maps containing transparency information related to an image. In general the maps allow an image to be made either completely or partially transparent, by describing which portions of the image are transparent and to what degree transparency is realized at each position in the image. FIG. 1a illustrates an example alpha image 100 for an associated image of a bat (not shown). The illustrated white area in the alpha image represent areas that are opaque when displaying the bat image; the illustrated black area represents those parts of the bat image that are completely transparent.

In addition to describing areas of complete opacity or complete transparency, an alpha image oftentimes contains intermediate levels of transparency. This is illustrated, for example in FIG. 1b, which shows a close-up 110 of the alpha image. In the close-up, intermediate levels of transparency, indicated by shades of gray in between black and white, can be seen. Oftentimes these intermediate levels of transparency are found around an object boundary, as they are in FIG. 1b.

In a typical alpha image implementation, these varying levels of transparency would be represented by values in between a maximum and minimum pixel value for each pixel in the alpha image. Thus, for example in FIG. 1b, if the image represents transparency using an 8 bit value, the pixels which represent transparent areas (shown here as black pixels) would contain the minimum value of 0. The "white" pixels, which represent complete opacity, would contain, in this example, the full value of 255 ($2^8-1$). Each of the boundary values, then would contain a value in between 0 and 255, depending on the opacity or transparency desired.

In addition to still images, alpha images can describe transparency for video as well. Typically, for video a sequence of alpha images, for example one alpha image per frame, is used. As with many pieces of information that are contained in video sequences, however, it is desirable to reduce the number of bits that are required to encode alpha images in a video sequence or bitstream, in order to reduce overall video bit rate.

Examples of Video Compression

Engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system.

Many existing encoders use at least one type of frequency transform during compression, such a discrete cosine transformation ("DCT"). For example, the encoder splits the key picture into non-overlapping blocks of samples and applies a forward frequency transform to individual blocks. The frequency transform maps the sample values of a block to transform coefficients, which are coefficients of basis functions that correspond to frequency components. In particular, the lowest frequency coefficient—called the DC coefficient—indicates the average sample value for the block. The other coefficients—called AC coefficients—indicate patterns of changes in sample values in the block, from gradual low-frequency variations across the block to sharper high-frequency variations within the block. In many encoding scenarios, a relatively small number of frequency coefficients (e.g., the DC coefficient and lower frequency AC coefficients) capture much of the energy or signal content in the block. The encoder quantizes the transform coefficients, resulting in a block of quantized transform coefficients. The encoder further encodes the quantized transform coefficients, for example, using entropy coding, and outputs a bitstream of compressed video information.

In corresponding decoding, a decoder reads the bitstream of compressed video information and performs operations to reconstruct the pictures that were encoded. When the encoding uses lossy compression (e.g., in quantization), the reconstructed pictures approximate the source pictures that were encoded but are not exactly the same. For example, to reconstruct a version of the original 8×8 block of the key picture, the decoder reconstructs quantized transform coefficients using entropy decoding. The decoder inverse quantizes the quantized transform coefficients of the block and applies an inverse frequency transform (such as inverse discrete cosine transform or "IDCT") to convert coefficients from a frequency domain to a pixel (or "spatial") domain, producing the reconstructed version of the original 8×8 block. Typically, an encoder also reconstructs encoded pictures, for use in subsequent motion compensation.

According to one possible definition, quantization is a term used for an approximating non-reversible mapping function commonly used for lossy compression, in which there is a specified set of possible output values, and each member of the set of possible output values has an associated set of input values that result in the selection of that particular output value.

Quantization can affect the fidelity with which coefficients are encoded, which in turn can affect bit rate. Coarser quantization tends to decrease fidelity to the original transform coefficients (and produce more distortion) as the coefficients are more coarsely approximated. Bit rate also decreases, however, when decreased complexity can be exploited with loss-less compression (e.g., entropy encoding). Conversely, finer quantization tends to preserve fidelity and quality (and produce less distortion) but results in higher bit rates.

Different encoders typically use different parameters for quantization. In many encoders, a step size of quantization is set for a macroblock, block, picture, or other unit of video. The extent of quantization is parameterized in terms of the quantization step size, which is adapted to regulate quality and/or bit rate. Coarser quantization uses larger quantization step sizes. Finer quantization uses smaller quantization step sizes.

Examples of Problems Encoding Alpha Images

Alpha images have what is sometimes thought of as a relatively simple structure, particularly when characterized, for example, by the entropy of the alpha image, which is low compared to most visual images. This does not mean, however, that they are easy to encode efficiently in a video bitstream. Oftentimes, despite the simple structure of alpha images, it is desirous to devote as small as a fraction of the bitstream to the alpha plane.

Furthermore, for the sake of visual quality, it is often desired that 1) white and black pixels in the alpha image are preserved accurately, and 2) that edge information is preserved as best as possible. This is difficult using traditional DCT (or other Fourier transform) encoding techniques, because these techniques will not necessarily perfectly preserve the black and white portions of the alpha image, and may not be tuned to maintain the "gray" edges in the alpha image.

Additionally, for the sake of computational complexity, it is often desired that any alpha codec be low in complexity because the bulk of CPU usage is desired to be directed toward decoding the associated video channel. Moreover, the process of compositing the alpha image with the associated video is in itself non-trivial and there is also the likelihood of a second channel of video (for example, for a background) which must be decoded in real time as well. Finally, it is desirous for an alpha image codec to support both lossless and lossy coding of an alpha channel. An alpha image encoding and decoding solution that addresses these issues is what is needed.

SUMMARY

Encoders and decoders for efficiently encoding alpha images for inclusion in video bitstreams are described. In an encoder, alpha image data is quantized as a first step before differential encoding. The quantized alpha image data is then differential encoded and represented in a modulo domain before entropy encoding to take advantage of certain distribution features of typical alpha image data. A decoder performs differential decoding of encoded alpha image data before dequantization. During differential decoding, the data is converted from a modulo domain to a continuous domain. Dequantization is performed using a technique which results in reconstructed alpha image values which include 0 and maximal values within the acceptable alpha image data range so that the process preserves these values for reconstructed alpha images. In alternative encoders and decoders, quantization and dequantization is not performed to provide for lossless encoding and decoding.

In one implementation, one or more computer-readable media are described which contain computer-executable instructions. The instructions, when executed by a computer, cause the computer to perform a method for decoding an alpha image encoded in a bit stream. The method comprises entropy decoding encoded data from the bit stream to produce differential residual data for the image, where the differential residual data is encoded in a modulo domain. The method also comprises differential decoding the residual data to produce quantized data for the alpha transparency image, where the quantized data is represented in a continuous domain. The method also comprises dequantizing the quantized data from the continuous domain to produce reconstructed data for the alpha image such that a quantized data value representing a full encoded alpha image value is dequantized to result in a full reconstructed alpha image value.

In another implementation, a method for encoding an alpha transparency image in a video sequence is described. The method comprises representing data for the alpha transparency image in a modulo domain and transmitting the data in the modulo domain in a video bit stream.

In another implementation, a method for decoding an alpha transparency image in a video sequence is described. The method comprises receiving a video bit stream containing alpha image data in a modulo domain, transforming the modulo domain alpha image data into quantized data in a continuous domain, and dequantizing the quantized data to produce reconstructed alpha transparency data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be made apparent from the following detailed description of embodiments that proceeds with reference to the accompanying drawings.

BRIEF DESCRIPTION OF THE DRAWINGS

FIGS. 3a and 3b are example histograms for an pixel and residual alpha image data in a modulo domain.

DETAILED DESCRIPTION

Figure 1B:
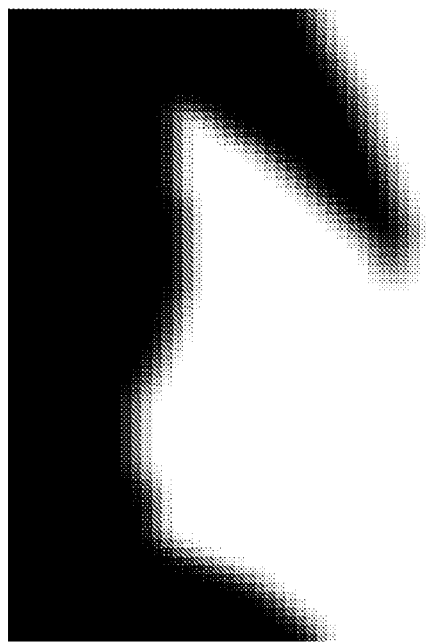
FIGS. 1a and 1b are illustrations of an example alpha image.

The present application relates to innovations in encoding and decoding of alpha images for a video sequence. Many of these innovations provide for efficient techniques of coding alpha images at relatively low bitrates. One innovation includes the quantization of alpha image data as a first step before differential encoding during the encoding process. A related innovation includes differential decoding of encoded alpha image data before dequantization during decoding. Another innovation includes representation of alpha image data in a modulo domain before entropy encoding to take advantage of certain distribution features of typical alpha image data. A related innovation involves the use of modulo operators which provide mappings for alpha image data between continuous and modulo domains. Another innovation includes a dequantization technique which results in reconstructed alpha image values which include 0 and maximal values within the alpha image data range.

For example, during encoding, an alpha image is first quantized, then differential encoded to produce residual data which is represented in a modulo domain. This residual data is then entropy encoded and transmitted in a video bitstream. In another example, during decoding, a video bitstream is received with entropy-encoded alpha image data. After entropy-decoding the data, which is represented in a modulo domain, the data is differential decoded to produce quantized pixel data in a continuous domain. Then the data is dequantized to produce reconstructed alpha image data. In one example the data is dequantized using a dequantizing technique which ensures that minimal and maximum encoded values are mapped to minimal and maximum reconstructed values.

Various alternatives to the implementations described herein are possible. For example, certain techniques described with reference to flowchart diagrams can be altered by changing the ordering of stages shown in the flowcharts, by repeating or omitting certain stages, etc., while achieving the same result. As another example, several of the innovations described below applicable to various types of video codecs (e.g., MPEG-2, H.264/AVC, VC-1). Indeed, in various implementations, the described alpha image codec is based on motion-compensated temporal sequence coding like other video codecs, for example VC-1 or MPEG-2. In one implementation, predicted, or "P" frames are coded using VC-1. However, in this implementation, for intra, or "I" frames, VC-1 (or H.264 or MPEG-2) codes may not be able to achieve desired coding efficiencies.

For the sake of description below, the techniques described herein are restricted to I frame coding of alpha image frames. In various implementations, P frame coding may use existing techniques based on codecs like VC-1, or may use different schemes. Alternatively, P frame coding may not be used at all.

The various techniques and tools described herein can be used in combination or independently. For example, although flowcharts in the figures typically illustrate techniques in isolation from other aspects of encoding and decoding, the illustrated techniques in the figures can typically be used in combination with other techniques (e.g., shown in other figures). Different embodiments implement one or more of the described techniques and tools. Some of the techniques and tools described herein address one or more of the problems noted in the Background. Typically, a given technique/tool does not solve all such problems, however. Rather, in view of constraints and tradeoffs in decoding time and/or resources, the given technique/tool improves performance for a particular implementation or scenario.

Examples of Alpha Image Characteristics

Figure 1A:
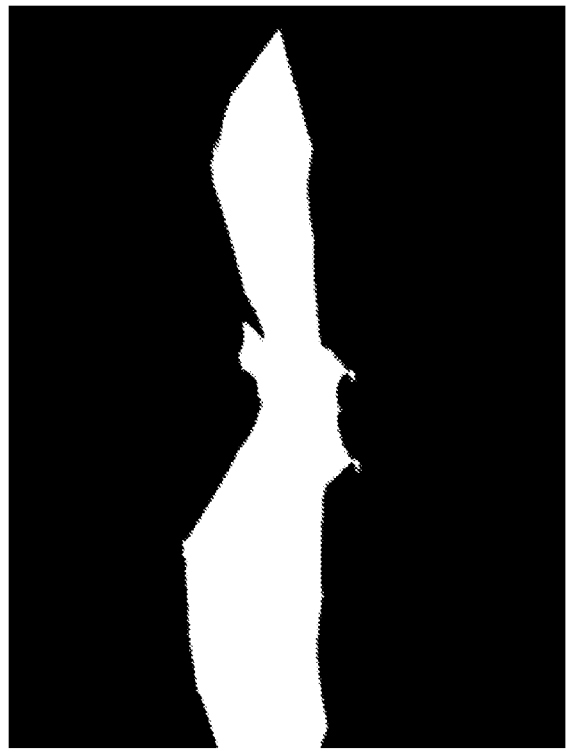

Typical alpha images are statistically very distinct from typical image and video data. By noticing and taking advantage of these characteristics, the techniques and tools provided herein provide for more efficient encoding and decoding of alpha images. Typical alpha images are characterized by the following features: 1) large continuous "black" and "white" areas, 2) smooth outlines of "white," or opaque, areas, and 3) "grey," or partially transparent pixels typically lying on a narrow boundary between "black" and "white" regions. Each of these characteristics are illustrated in the example alpha image of FIGS. 1a and 1b. For example, as per 1) above, FIG. 1a shows two general large areas: the "white," opaque area where the bat image is located, and the "black," transparent area surrounding the bat. Similarly, as in 2), FIG. 1a shows that the white bat-shaped portion of the image has smooth outlines. Finally, as detailed in the illustration of FIG. 1b, there is a narrow band of "gray," partially-transparent pixels at the boundary between the "white" and "black" areas, as in 3) above.

Alpha images also exhibit a fourth characteristic: a highly bimodal distribution. This means that a) a significant fraction of a typical image is "black" or transparent (typically signaled with a pixel value of 0), b) a second significant fraction of a typical image is "white" or opaque (typically signaled by the largest integer in a specified bit range, such as 255 for 8 bit data), and c) relatively few samples of a typical image is found in the range between "black" and "white" (between 0 and the full integer value).

Figure 2B:
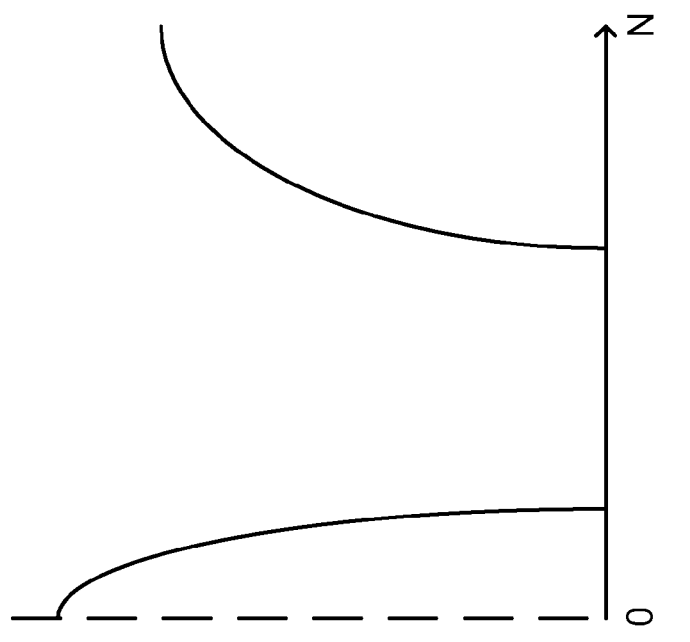
FIGS. 2a and 2b are example histograms for an alpha image in continuous and modulo domains.
Figure 2A:
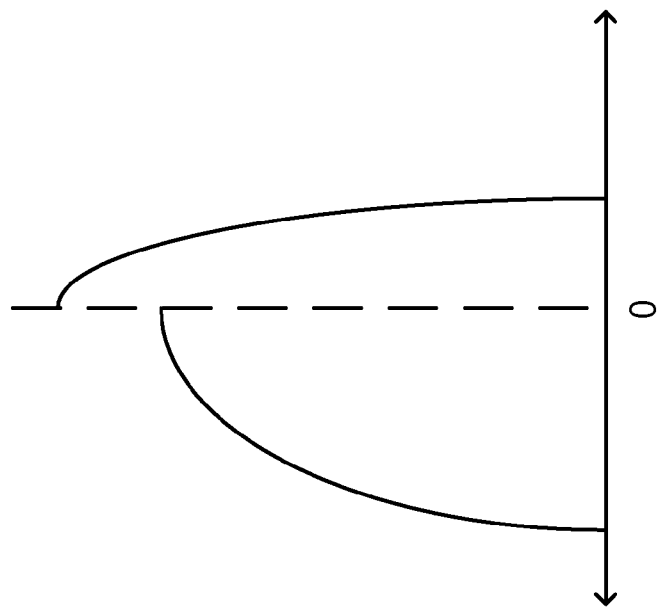

And example of this distribution is illustrated in FIG. 2a, which shows an example histogram for an alpha image where the pixel values are represented in a continuous domain (e.g. the pixel values are found between 0 and N, where N is the largest value in the bit range specified for the alpha image, such as 255.) As FIG. 2a shows, the vast majority of values in the described alpha image are found either very close to 0 or very close to N. Indeed, while the histogram shown in FIG. 2a is stretched somewhat horizontally for the purposes of illustration, the Figure may actually show a distribution that is not as bimodal as in most alpha images. In contrast, a typical alpha image may show a distribution where values fall much closer to the extremes.

It is this bimodal distribution, however, that facilitates some of the innovations described herein. FIG. 2b shows the same histogram, represented in a modulo domain (as opposed to a non-modulo or "continuous" domain, as it is used herein). In one implementation, alpha image data may be represented in a modulo domain using a signed modulo operation, as described below. As FIG. 2b shows, because the distribution of alpha image data is so skewed to the extremes of the alpha data range in a continuous domain, the data is predominately found close to zero when represented in a modulo domain. Thus, the values that fall close to the zero (the transparent end) in the continuous domain remain close to zero in the modulo domain, while the values that fall close to the high end of the alpha image data range (the opaque end) in the continuous domain are represented in the modulo domain as negative values that also fall very close to zero.

This characteristic of alpha image data is used in the techniques described herein to facilitate efficient encoding of the alpha image data. For example, when using an entropy encoding scheme that utilizes shorter bit patterns for values that are closer to zero, it is desirable to represent the data in a way that it falls close to zero before entropy encoding.

FIGS. 3a and 3b show a further characteristic of the distribution of alpha image data. FIG. 3a shows example traditional pixel data, represented in a modulo domain, for an example alpha image. FIG. 3b shows an example histogram for differential encoding residual data generated from the pixel data of FIG. 3a. Differential encoding uses differential prediction, where the values of pixels are predicted based on the values of those pixels around them. Any differences between the predicted values and the actual pixel values is then recorded as a residual value. Thus, in one example, the data values used for generating the histogram of FIG. 3b can be generated from the pixel data in an alpha image through a left-side prediction rule, such as $R=X-L$, where X is the value in a particular pixel, and L is the pixel value to the left of that particular pixel.

This type of encoding is of particular usefulness when encoding alpha images, because the majority of alpha image values are found adjacent to identical or similar values. This means that, generally, encoded residual values will be zero or very close to zero. Thus, as FIG. 3b shows, when representing the residual data in a modulo domain, the distribution is also found close to zero Additionally, the bimodal distribution of the pixel values means that those values compared during predictions that are not close together will likely be quite far apart. Thus, for the resulting very large residuals, the modulo-represented form of the residual will still fall close to zero. For example, if a pixel with a value of 254 is found next to a pixel of 1, using a left-prediction rule in a continuous domain means encoding a residual value of 253, while the same residual value in a modulo domain would be −3. This is close enough to zero to provide substantial efficiencies during entropy encoding over the value 253. While the distribution of the residual data may not be identical to the distribution of the pixel data (just as it is not represented identically between the example FIGS. 3a and 3b), these distributions are similar enough to allow for additional coding efficiencies by representing differential encoding values in a modulo domain before entropy encoding. Furthermore, in the rare circumstances where the residual data does not demonstrate a compact distribution, the process of representing it in the modulo domain (as described below) does not lose any information, and thus will not substantially decrease efficiency.

Examples of Encoder and Decoder Modules

Figure 4A:
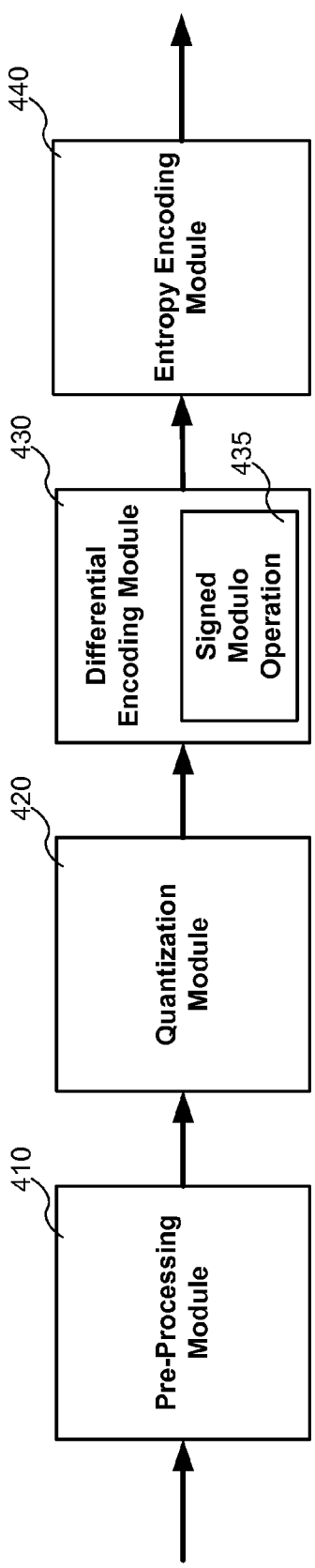
FIGS. 4a and 4b are block diagrams illustrating exemplary methods of alpha image encoding and decoding.
Figure 4B:
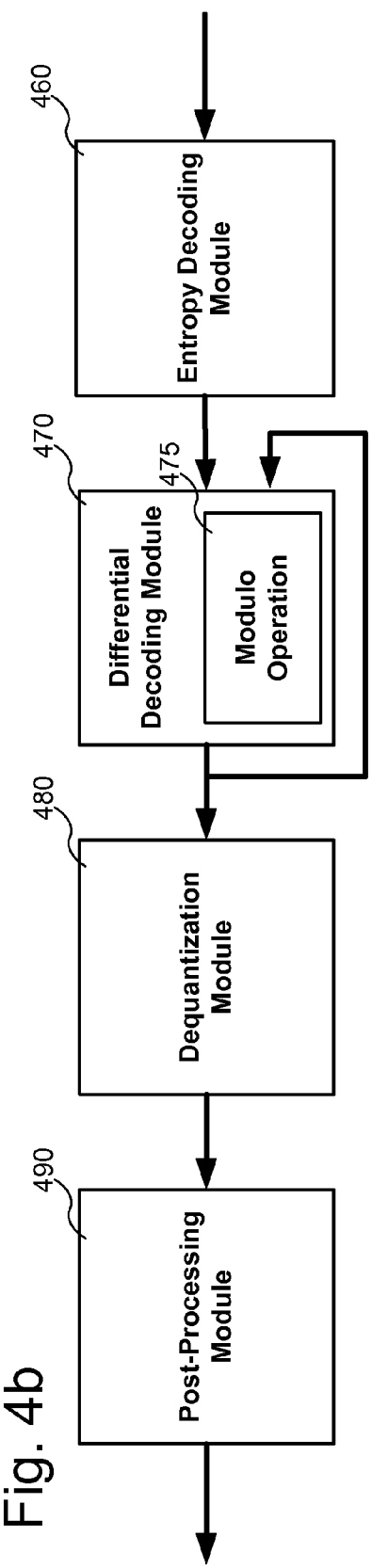

FIGS. 4a and 4b are block diagrams illustrating particular implementations of an alpha image encoder 400 and an alpha image decoder 450. The illustrated alpha image encoder 400 receives an alpha image and encodes it for transmission in a video sequence, while the illustrated alpha image decoder 450 receives an encoded alpha image from a video sequence and decodes it into alpha image data. While FIGS. 4a and 4b do not illustrate a traditional video codec, it will be understood that the techniques and modules described herein may be used along with traditional video codecs and may encode and decode alpha images associated with particular pieces of a video sequence, such as frames, pictures, or slices. Additionally, the relationships shown between modules within the encoder 400 and decoder 450 indicate general flows of information in the codec; other relationships are not shown for the sake of simplicity. In particular, FIGS. 4a and 4b do not show side information indicating the encoder settings, modes, tables, etc. used for a video sequence, picture, macroblock, block, etc. Such side information, once finalized, is sent in the output bitstream, typically after entropy encoding of the side information. Additionally, the block diagrams of FIGS. 4a and 4b cover only certain core compression and decompression processes and techniques, for the sake of simplicity of description. Other techniques not shown include bitstream wrapper, timestamping, synchronization, packetization, error resilience, and others.

Particular embodiments of video encoders use a variation or supplemented version of the encoder 400 and decoder 450. Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques.

The alpha image encoder 400 of FIG. 4a begins with a pre-processing module. In various implementations, this module may comprise generation or other manipulation of the alpha image that is to be encoded. For example, in some implementations, for the sake of meeting a rate constraint in tight bitrate situations, the input alpha image data may be resampled at a lower spatial sampling rate.

Next, the illustrated encoder 400 shows a quantization module 420. Particular techniques for quantization will be described below. In various implementations, if lossless encoding of alpha images is desired, the quantization module may be instructed not to perform quantization or may be given a quantization parameter that precludes quantization. Instead, the alpha image data would then be directly passed to the next module. This next module after the quantization module 420 is a differential encoding module 430, which takes the quantized data provided by the quantization module 420 and applies one or more differential prediction rules to the quantized data to produce differential encoded residual data. Particular details for differential encoding is described below. In one implementation, differential encoding is utilized instead of more traditional DCT encoding because DCT encoding would waste a high degree of bandwidth attempting to encode the gray boundary edges between black and white patches in the alpha image. For many typical alpha images, differential encoding is better suited to capture this information efficiently.

It may be noticed that the operation of the illustrated encoder departs from traditional encoders in that quantization is performed before differential encoding; in many traditional video encoding systems, such as those described in the background, transform encoding is performed before quantization, not after. One reason for performing quantization before the differential encoding in the present techniques is to ensure that maximum and minimum alpha image values are maintained after reconstitution on the decoder side (when using the dequantization techniques described below). Another difference between the instant encoding techniques and traditional video encoding techniques is that, in traditional encoding, if quantization were performed before DCT encoding, the resulting DCT coefficients would still contain a large number of small, close-to-zero values, especially when compared to DC and high-level AC coefficients, which would then need to be reduced for efficiency's sake using a second quantization. Because the type of encoding used here, differential encoding, does not result in the same degree of "small" values, the present techniques are able to efficiently perform quantization before differential encoding.

FIG. 4a also illustrates a signed modulo operation 435 (implemented as part of the differential encoding module 430 or as a separate submodule) which may be used to represent the differential encoded data in a modulo domain, as shown above. In alterative implementations, the step of representing the differential encoded data in a modulo domain may be omitted while still practicing one or more of the innovations described herein. Particular implementations of the modulo operations are described below.

Finally, at the differential encoded data (in a modulo domain) is passed to an entropy encoding module 440. As discussed above, many innovations described herein are performed to allow for efficient entropy encoding by the entropy encoding module 440. In various implementations, many techniques may be used to encode residuals, including run-length encoding, Golumb-Rice coding, arithmetic coding, Huffman coding, adaptive coding, and/or combinations of these techniques.

FIG. 4b illustrates a block diagram for an alpha image decoder 450, which decodes alpha image data encoded by the alpha image encoder 400 to produce alpha images. FIG. 4b starts by illustrating an entropy decoding module 460 which entropy decodes data from a video bitstream which has been entropy-encoded by the module 440, for example using one or more of the entropy coding techniques described above. Next, module 470 performs differential decoding on the data. In one implementation, the differential decoding module utilizes various rules encoded in the received video bitstream to determine which differential prediction rule to utilize during decoding. In other implementations, the particular prediction rules to be used may be pre-determined; for example particular prediction rules may be used for residuals corresponding to particular spatial portions of the alpha image being decoded. Examples of these prediction rules will be described below. The differential decoding module also optionally utilizes a modulo operation 475, as will be discussed herein.

Next, after differential decoding, the data (in a continuous domain) is sent to a dequantization module 480, where the data is reconstructed into alpha image data. In various implementations, particular dequantization techniques are utilized to ensure that the reconstructed values contain proper alpha image values. Hence, according to certain techniques described herein, if a maximal value in an alpha image (e.g. 255 in an 8-bit image) is quantized and encoded, it will be reconstructed as the maximal value 255 by the dequantization module 480. This is in contrast to many dequantization techniques, which do not guarantee to reconstruct maximum values. Finally, at block 490, post-processing is performed on the reconstructed alpha image. In one implementation, if pre-processing at the encoder side resampled the alpha image data at a lower sampling rate, the reconstructed alpha image data may be unsampled to a full frame at this post-processing module.

Examples of Modulo Operations

As discussed above, various techniques described herein are performed with reference to modulo and signed modulo operations. Two implementations of these operations are defined as follows. First, the modulo operation mod(x) is defined in one implementation for a value x as:

$$\mathrm{mod}(x) = x - M \left\lfloor \frac{x}{M} \right\rfloor$$

where M referred to as the "base" of the modulo operation, defined as the permissible range of the quantized data. In one implementation, the base M may be equal to the range of the source data, which is denoted by N (e.g. N=255 for 8-bit data). In another implementation, M may be a number smaller than N. The signed modulo operation, is defined in one implementation as follows:

$$\mathrm{smod}(x) = \mathrm{mod}\left(x + \left\lfloor \frac{M}{2} \right\rfloor\right) - \left\lfloor \frac{M}{2} \right\rfloor$$

with mod(x) defined as above.

Figure 5:
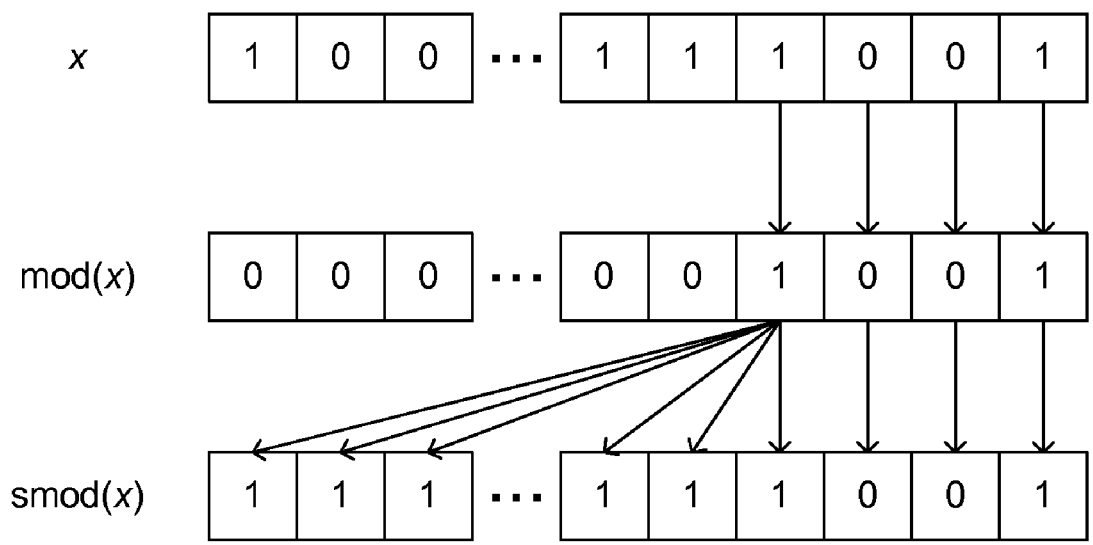
FIG. 5 is a block diagram illustrating example results of modulo operations on an example binary value.

These operations exhibit particular characteristics when M is chosen to be a power of 2, such as when $M=2^m$ for a positive integer m. In this case, mod(x) is simply the last m bits (in the binary two's complement representation) of x. smod(x), by comparison, is then the sign-extended version of mod(x), where sign extension comprises extending the highest significant bit of mod(x) (e.g. the mth bit, counting from the least significant bit) to all higher-order bits. FIG. 5 illustrates these characteristics for a value of m=4(M=16) for a value for x. In the illustrated case, the operation mod(x) simply drops all bits other than the last four bits of x, while smod(x) keeps those last four bits, but extends the highest-significant bit of mod(x) to all higher-order bits.

In various implementations, the smod(x) operation may be implemented either a) natively in hardware, b) as a left-bit shift to align the top bits and right shift to propagate sign, or c) with lookup tables. mod(x) may be similarly implemented in various implementations. Additionally, while these particular characteristics of the operations are found when M is a power of 2, various innovations described herein may still be implemented for any arbitrary value of M. However, for the sake of simplicity, it will be assumed going forward that M is a power of two.

Examples of Quantization and Dequantization

To aid in explanation, we will describe implementations of dequantization processes before describing quantization processes. In general, the dequantization process (as performed by the dequantization module 480) is specified by a rule which maps a quantized value (here "v") to a reconstructed value (here "u"). The mapping is defined by a quantization parameter QP, which allows the quantization to be scaled at varying degrees of granularity depending on resources and acceptable detail loss. In one implementation, QP may range from 0 to n−1, where $n=\log_2 N$ with N being the range of the source alpha image data. The quantized value then falls within the range $[0,1,\ldots,2^m-1]$ where m=n−QP.

In one implementation, the dequantization rule is given as follows:

$$u = \mathrm{round}\left(\frac{v(2^n - 1)}{2^m - 1}\right)$$

where "round" is a function defined as follows:

$$\mathrm{round}\left(\frac{x}{y}\right) = \left(x \cdot \left\lfloor \frac{2^r}{y} \right\rfloor + 2^{(r-1)}\right) \gg r$$

where r is a value based on the available arithmetic precision of the architecture on which the techniques described herein are implemented. It can be seen that, when QP=0, m=n, and therefore u=v. With this setting, there is effectively no quantization performed. Additionally, by the definitions of the functions, y in the round function becomes a function of m which is itself a function of QP. Thus, the term $$\left\lfloor \frac{2^r}{y} \right\rfloor = \left\lfloor \frac{2^r(2^n - 1)}{2^{n-QP} - 1} \right\rfloor$$

can be computed once and reused for each image.

In implementations using the value n=8, QP can range from 0 through 7 inclusively. For this choice of n, the dequantization rule simplifies to the mapping:

$$u = \mathrm{round}\left(\frac{255 \cdot v}{D}\right), D \in \{255,127,63,31,15,7,3,1\}$$

Under this mapping, the denominator D divides 255 for several cases (e.g D=255, 15, 3, and 1), which correspond to QP=0, 4, 6, and 7. For these values of QP, the rounding function is redundant and may be omitted from the implementation. For other cases, it may be used as above with r=8.

As mentioned above, this particular dequantization rule has advantages over a more traditional dequantization rule such as, for example, $u=v \cdot 2^{QP}$. The chief advantage is that the values of 0 and N−1 (e.g. 255 in for an 8-bit image) are possible reconstruction levels. Under the more traditional $u=v \cdot 2^{QP}$ rule, this would only be true for QP=0 (i.e. no quantization). This is an important effect of this dequantization technique, as the values 0 and N−1 are typically among the most common values (if not the most common values) in an alpha image, and so it is important that these value survive the quantization process without loss.

A corresponding quantization rule can be defined based on the dequantization rationale described above. It should be noted that, because quantization is an encoder-side process, in various implementations, the quantization rule may be changed without affecting bitstream design or decoder specification. In one implementation, the quantization rule is defined as a simple bit shift:

v=x>>QP where x is the source pixel, v is the quantized value, and ">>" denotes a right shift of integer data. It may be noted that data is lost when QP>0.

Examples of Differential Encoding

As discussed above, various differential predictors may be used by the differential encoding module 430 to generate residual data from pixel data. In one implementation, three predictors are defined: 1) Predict from Left ("PL"), 2) Predict from Top ("PT"), and 3) Predict from Left, Top, and Top-Left ("PTL"). "Left" and "top" here are defined in terms of a typical raster scan (e.g. left-to-right and top-to-bottom). In other implementations, if the direction of the raster scan changes, the actual spatial locations of these terms may change. In alternative implementations, one or more of these rules may be omitted, or other rules may be used.

Particular implementations of these rules as defined as follows, though alternative implementations may use alternative rule implementations. The PL rule uses the sample to the left of the current pixel as the predictor. Thus, the predicted residual R is determined as:

$$PL: R=\text{smod}(X-L)$$

The PT rule uses the sample above the current pixel as the predictor. Thus, the predicted residual R is determined as:

$$PT: R=\text{smod}(X-T)$$

The PTL rule uses a second-order rule based on using the left, top, and top-left pixels to the current pixel as predictors. Thus, the predicted residual R here is determined as:

$$PTL: R=\text{smod}(X-L-T+TL)$$

It should be noted that, in each case, in the course of computing the residual the difference between X and the predictor in the continuous domain is represented in the modulo domain using the signed modulo operator discussed above. For the reasons discussed with respect to FIG. 3, this makes available efficiencies which are exploitable during entropy encoding. In various implementations, usage of these rules is defined for edge cases. For example, PT may always be used for the first column of an image, while PL may be used for the top row. Additionally, in one implementation, 0 is used as a prediction for the top left sample.

In alternative implementations, different rules may be used for the predictors. For example, an alternative implementation may use the following PTL rule, expressed in a C-style syntax:

$$R=\text{smod}(X-(\text{abs}(T-TL)<\text{abs}(L-TL)?L:T))$$

This rule would pick the direction of prediction dynamically based on whether the top left sample correlates better with the top or left pixel. Alternatively, in another implementation, the following rule may be used instead:

$$R=\text{smod}(X-\text{Clip}(T+L-TL)).$$

This rule would use a predictor which is clamped to an appropriate range in case the plane defined by L, T, TL, evaluates to a value outside a permissible range at the current location X.

While these rules for the PTL predictor may at first glance appear preferable to the relatively simple R=smod(X−L−T+TL) rule defined above, in one implementation the simpler rule is used because the alternative rules are nonlinear in nature. This means residuals produced by the nonlinear rules would not be able to be decoded in parallel, such as in SIMD, on the decoder side. In one implementation of the decoder, there is a pixelwise dependency of the data, which means that only one pixel may be differentially decoded at a time with a nonlinear rule. This limitation is avoided using a linear rule.

Examples of Differential Decoding

In implementations using the coding prediction rules given above, the following decoding rules are used:

$$PL: Y=\text{mod}(R+L)$$

$$PT: Y=\text{mod}(R+T)$$

$$PTL: Y=\text{mod}(R+L+T-TL)$$

It may be noted that these reconstruction rules use the modulo function "mod" defined above. Mathematically, these decoding rules are the inverse of the encoding rules described above; this derivation will be omitted, however, for the sake of simplicity of description.

In various implementations, each of the decoding rules discussed above may be implemented in parallel. Thus, for PT, in one implementation a multi-sample (e.g. 4-way) chunk of the row above the current row is used as a predictor and this is added in parallel to the multi-sample entropy-decoded residual to produce a multi-sample reconstruction.

In one implementation, PL is implemented in parallel as follows. For the purposes of this description, it is assumed that multi-sample reconstructions are mapped as RR= [R3|R2|R1|R0] where, without loss of generality, "multi=4," R0 is the first reconstructed sample, and R3 is the last reconstructed sample. Furthermore L is the reconstructed sample to the left of R0. Using these conventions, the rule to reconstruct values Y0 to Y3 is:

$$[Y3|Y2|Y1|Y0]=(RR+[0|0|0|L])*[0x01|0x01|0x01|0x01]$$

It should be noted that, in this implementation, three further points are observed. First, the multiplication is carried out on the whole word at once, rather than in an SIMD manner on each subword.

Second, any SIMD word size is chosen to be sufficiently large to accommodate the range N of each value as well as any bits that may result from the multiplication operation. Carry bits from a subword m in such an implementation are not made to cross over to subword m+1. The effect of the multiplication is therefore:

$$(RR+[0|0|0|L])*[0\times01|$$
$$0\times01|0\times01|0\times01]=[R3|R2|R1|R0+L]*$$
$$[0\times01|0\times01|0\times01|0\times01]=[R3|R2|R1|R0+L]+$$
$$[R2|R1|R0+L|0]+[R1|R0+L|0|0]+[R0+L|0|0|0]=$$
$$[R3+R2+R1+R0+L|$$
$$R2+R1+R0+L|R1+R0+L|R0+L].$$

This essentially propagates the prediction across the entire word length in one operation regardless of the number of subwords.

Finally, in some implementations of PL decoding it may be necessary to add some constant word CC to RR so as to make each subword of the resulting RR+CC non-negative in order to facilitate the above propagation. This addition can then be undone after multiplication as follows:

$$[Y3|Y2|Y1|Y0]=$$
$$(RR+CC+[0\times0|0\times0|0\times0|L])*[0\times01|0\times01|0\times01|0\times01]-$$
$$CC*[0\times01|0\times01|0\times01|0\times01].$$

For PTL decoding, one implementation is based on PL and PT. First, the reconstruction is computed based on the PL rule implementation given above. Then, a multi-sample chunk of the difference T−TL is added to the reconstruction. This difference can be computed in parallel as well.

As with encoding, in various implementations appropriate usage of these prediction rules are defined for edge cases. For instance PT can be used for every pixel in the first column and PL for every pixel in the top row. Also, 0 can be used as the prediction for the top left sample. Finally, while the modulo operation is performed on all reconstructed samples, the operation may be achieved in parallel as well, in one implementation using SIMD and the & operation on multi-words.

Examples of Quantizing and Prediction Signaling

In one implementation of the techniques described herein, the quantizer, being one of a limited set of n values can be signaled in a video bitstream using a fixed-length word with relatively little bitrate overhead or cost. The prediction rule used for residual data may be signaled in a variety of ways in various implementations, such as with a fixed-length code, a variable length code, or in a backward adaptive manner. In one backward adaptive implementation, the prediction rule may be updated based on previously-observed statistics which identify the best prediction rule of some causal history and which use the rule for the current segment of data. In one implementation this segment is a multi-word group of samples, such as, for example, a multi-word of length 16.

Examples of Alpha Image Encoding Processes

Figure 6:
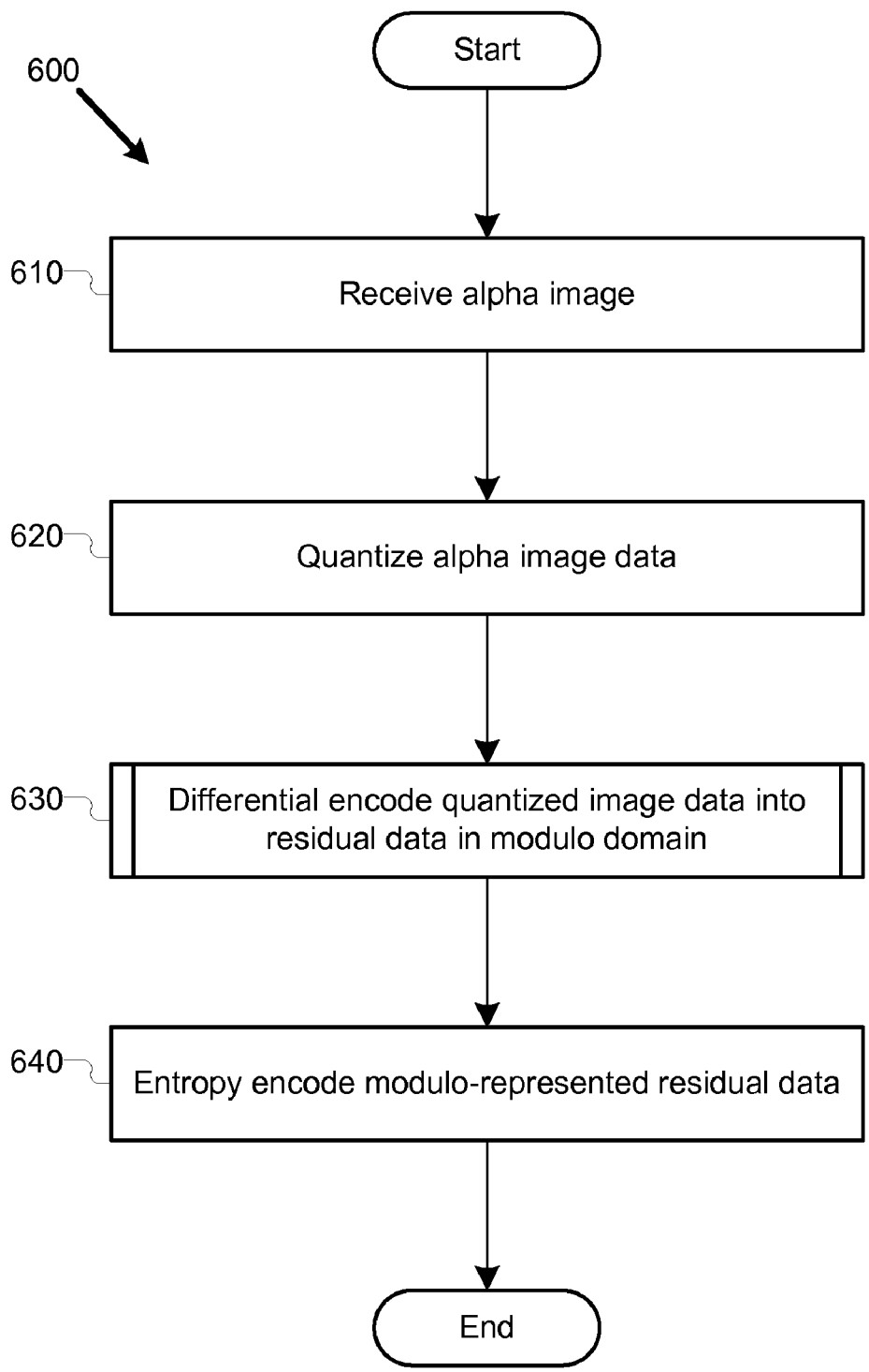
FIG. 6 is a flowchart illustrating an example process for encoding an alpha image.

FIG. 6 is a flowchart illustrating a process 600 for encoding an alpha image while utilizing various innovations described herein, performed, for example by the alpha image encoder 400. The process begins at block 610, where an alpha image is received by the alpha image encoder 400. In one implementation, pre-processing is performed at this point by the pre-processing module 410. Next, at block 620, the quantization module 420 of the alpha image encoder 400 performs quantization of the alpha image data. In one implementation, quantization is performed using the bit-shift techniques described above.

Next, the process continues to block 630, where the quantized alpha image data is differential encoded by the differential encoding module 430 into residual data in a modulo domain. Particular examples of this process are described below with reference to FIG. 7. Finally, the modulo-represented residual data is entropy encoded at block 640 by the entropy encoding module 440. This entropy-encoded data may then be included in a video bitstream during transmission.

Figure 7:
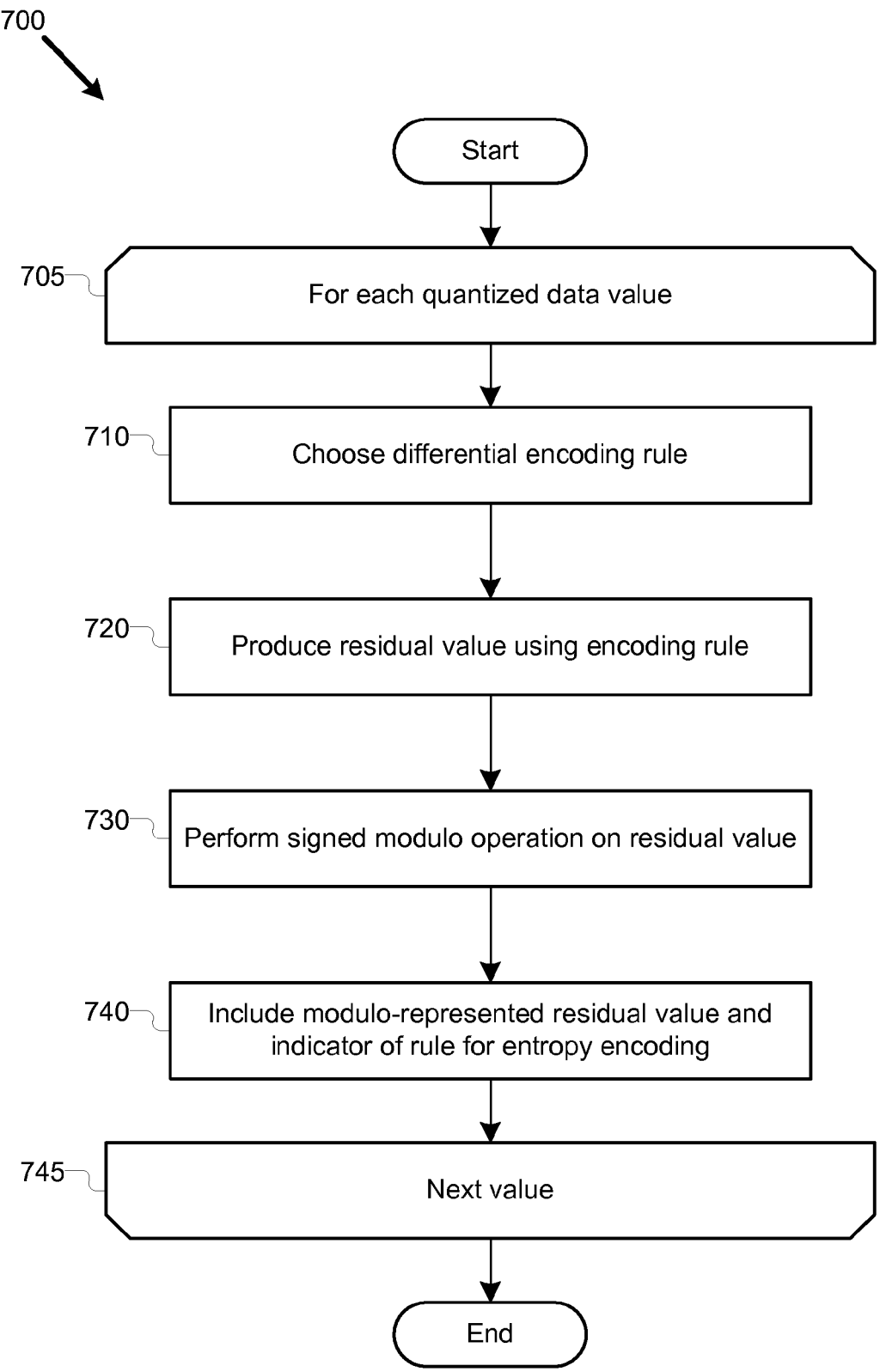
FIG. 7 is a flowchart illustrating a further example process for encoding an alpha image.

FIG. 7 is a flowchart illustrating a process 700 for the differential encoding module 430 to encode quantized data values and represent the resultant residual data in a modulo domain. The illustrated process begins at loop block 705, where the process enters a loop for each quantized data value. While such looping on each individual data value may be performed in some implementations of the techniques described herein, in alternative implementations the various sub-processes exhibited in the loop may be performed in parallel on multiple quantized data values at once. Particular examples of such parallel operation are described above. However, for the purposes of simple illustration, it will be assumed going forward that each value is operated on individually.

In the loop, a block 710 the differential encoding module 430 chooses a differential encoding rule to apply to the quantized data value. As discussed above, in one implementation this may be based on the spatial location of the quantized data value in the alpha image. In another implementation, statistical analysis or other techniques may be used to determine an appropriate rule. Next, at block 720 the chosen encoding rule is applied to the pixel data to produce a residual data value. Examples of such application are provided above. Next, at block 730 the module 430 performs the signed modulo operation 435 on the residual value. The combination of the operation of the differential encoding rule and the signed modulo operation is described above, for example in the operation of the PTL rule R=smod(X−L−T+TL).

Finally, at block 740, the modulo-represented residual value, as well as any necessary indicator of the rule used to encode the value is included the in bitstream for later entropy encoding. In alternative implementations, however, the modulo-represented residual value may not be included alongside an indicator of the rule used for the encoding, or no particular indicator may be included if not required by the decoder implementation. The process then begins the loop again at loop block 745.

Examples of Alpha Image Decoding Processes

Figure 8:
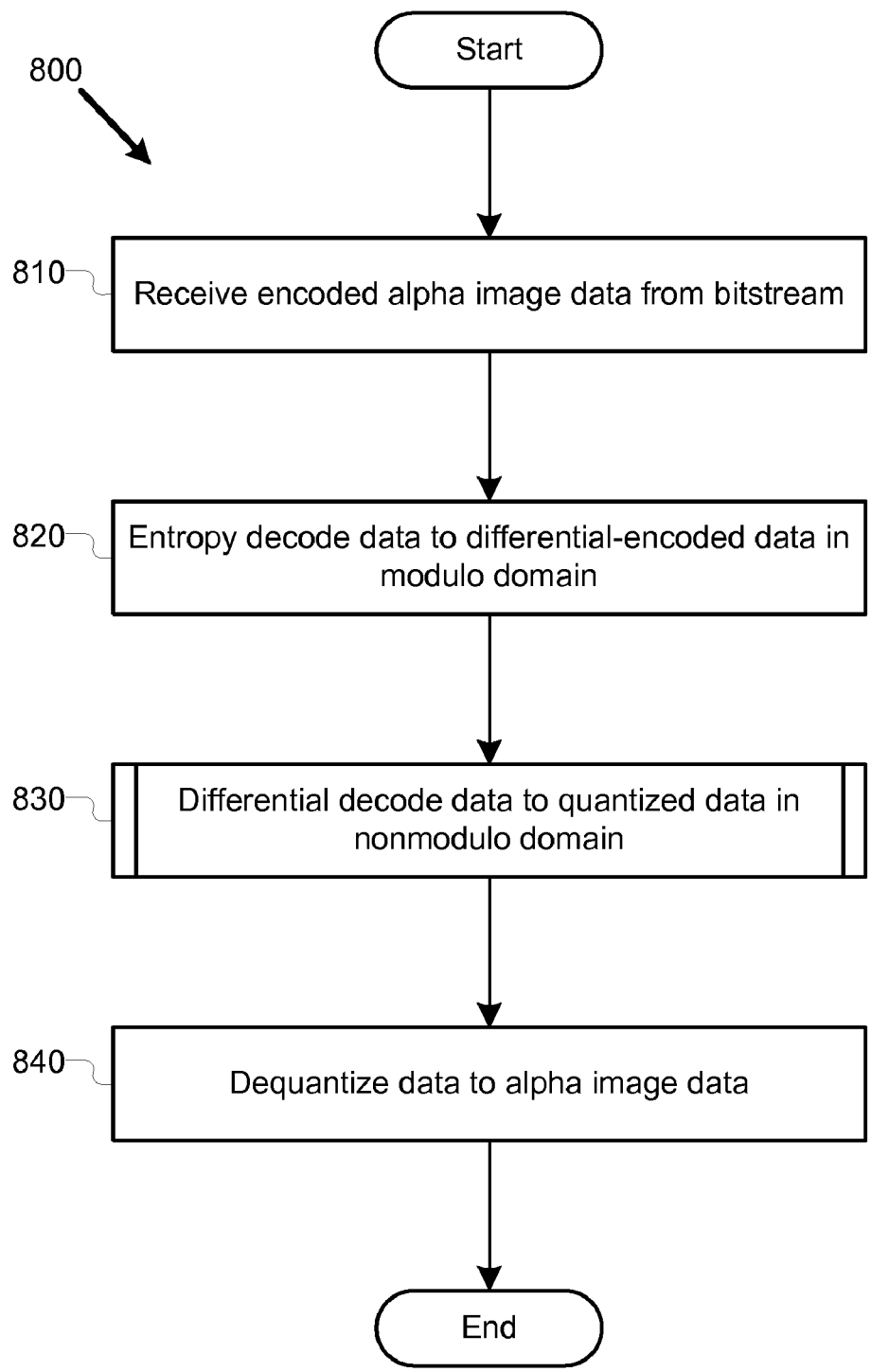
FIG. 8 is a flowchart illustrating an example process for decoding an alpha image.

FIG. 8 is a flowchart illustrating a process 800 for decoding an alpha image while utilizing various innovations described herein, performed, for example by the alpha image decoder 450. The process begins at block 810, where the decoder receives encoded alpha image data from a video bitstream. Next, at block 820, the entropy decoding module 460 decodes the received data.

Next, the process continues to block 830, where the decoded data, which comprises modulo-represented residual data is differential decoded by the differential decoding module 470 into quantized alpha image data. Particular examples of this process are described below with reference to FIG. 9.

Finally, at block 840 the dequantization module 480 of the alpha image encoder 400 dequantizes the alpha image data. In one implementation, quantization is performed using the techniques described above, which preserve maximum and minimum alpha image pixel values during reconstruction. Finally, in one implementation, post-processing is performed at this point by the post-processing module 490.

Figure 9:
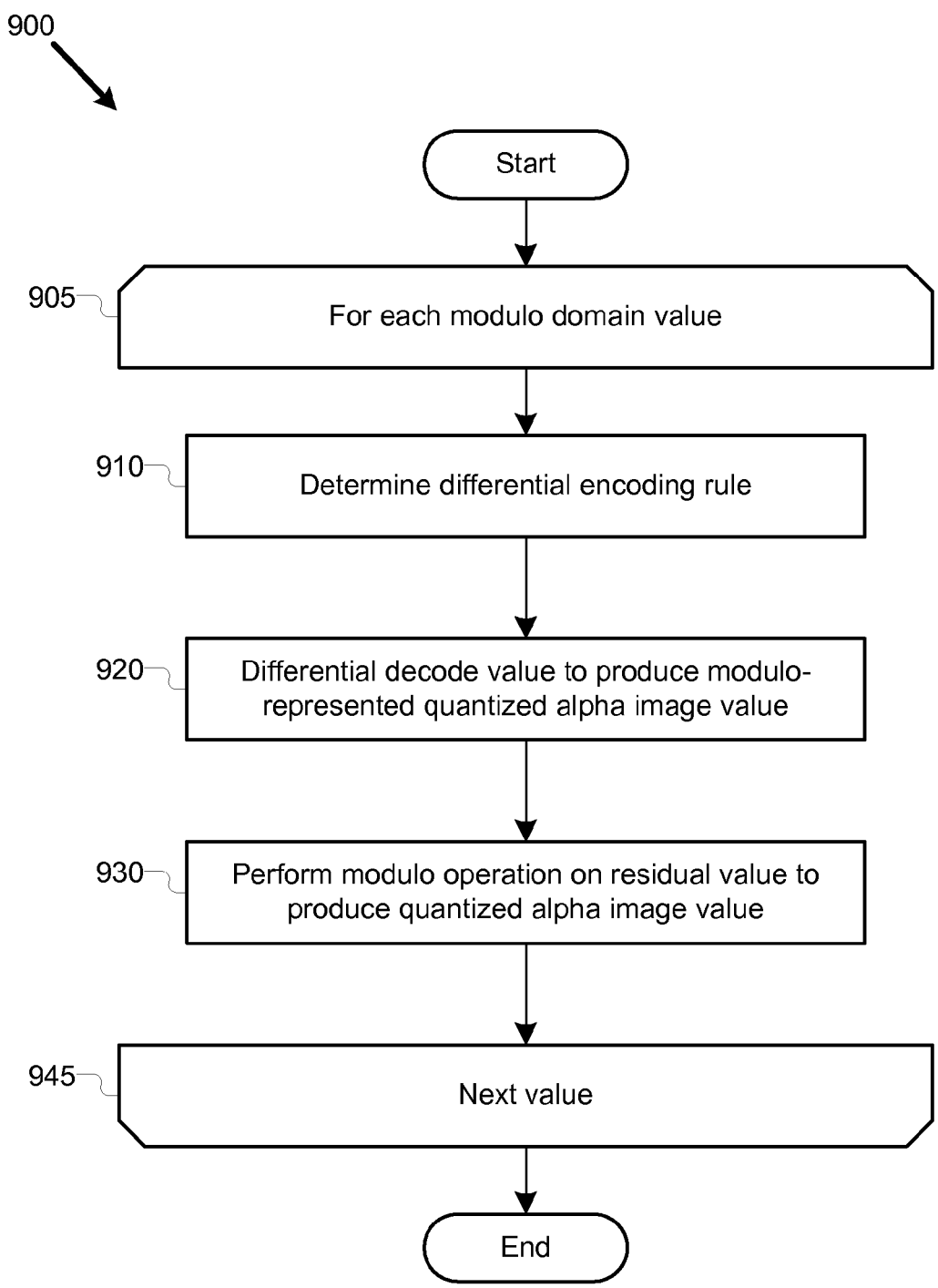
FIG. 9 is a flowchart illustrating a further example process for decoding an alpha image.

FIG. 9 is a flowchart illustrating a process 900 for the differential decoding module 470 to decode the modulo-represented residual values into quantized pixel values in a continuous domain. The illustrated process begins at loop block 905, where the process enters a loop for each residual data value. Just as for the process of FIG. 7, while such looping on each individual data value may be performed in some implementations of the techniques described herein, in alternative implementations the various sub-processes exhibited in the loop may be performed in parallel on multiple quantized data values at once. Particular examples of such parallel operation are described above. However, for the purposes of simple illustration, it will be assumed going forward that each value is operated on individually.

In the loop, a block 910 the differential decoding module 470 chooses a differential decoding rule to apply to the quantized data value. As discussed above, in one implementation this may be based on the spatial location of the quantized data value in the alpha image. In another implementation, the module 470 can determine the appropriate rule to use by receiving an signal in the bitstream which indicates a particular decoding rule to use. In another implementation, statistical analysis or other techniques may be used to determine an appropriate rule. Next, at block 920 the chosen decoding rule is applied to the pixel data to produce a modulo-represented pixel data value. Examples of such application are provided above. Next, at block 930 the module 470 performs the signed modulo operation 475 on the pixel value to provide a quantized pixel value in the continuous domain. The combination of the operation of the differential encoding rule and the signed modulo operation is described above, for example in the operation of the PTL decoding rule Y=mod(R+L+T−TL). The process then begins the loop again at loop block 945.

Computing Environment

Figure 10:
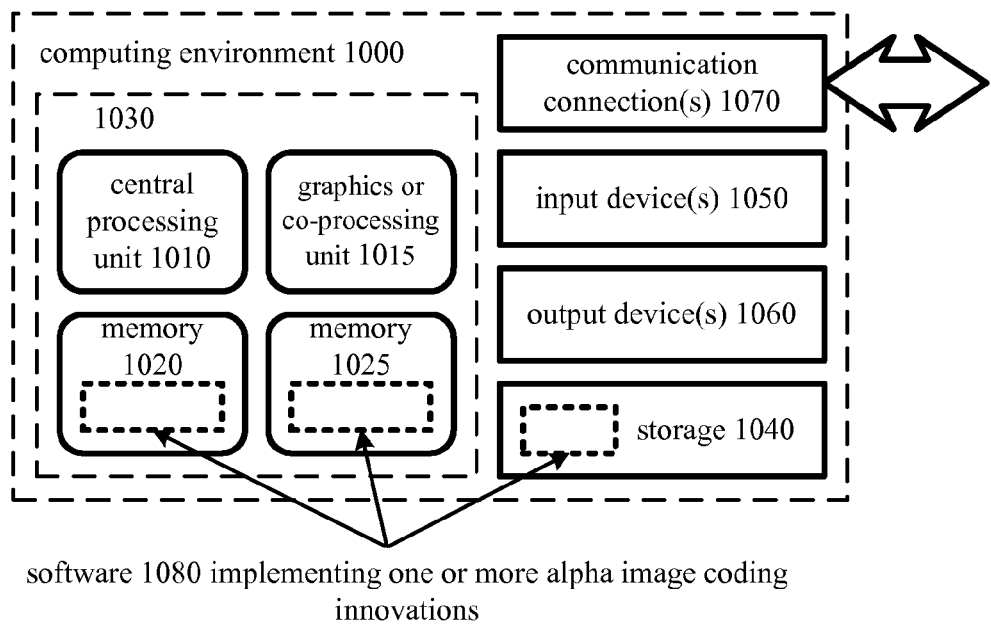
FIG. 10 is a block diagram illustrating a generalized example of a suitable computing environment in which several of the described embodiments may be implemented.

FIG. 10 illustrates a generalized example of a suitable computing environment 1000 in which several of the described embodiments may be implemented. The computing environment 1000 is not intended to suggest any limitation as to scope of use or functionality, as the techniques and tools may be implemented in diverse general-purpose or special-purpose computing environments.

With reference to FIG. 10, the computing environment 100 includes at least one CPU 1010 and associated memory 1020 as well as, in some implementations, at least one GPU or other co-processing unit 1015 and associated memory 1025 used for video acceleration. In FIG. 10, this basic configuration 1030 is included within a dashed line. The processing unit 1010 executes computer-executable instructions and may be a real or a virtual processor. In a multi-processing system, multiple processing units execute computer-executable instructions to increase processing power. A host encoder or decoder process offloads certain computationally intensive operations (e.g., iDCT) to the GPU 1015. The memory 1020, 1025 may be volatile memory (e.g., registers, cache, RAM), non-volatile memory (e.g., ROM, EEPROM, flash memory, etc.), or some combination of the two. The memory 1020, 1025 stores software 1080 for a decoder implementing one or more of the decoder error detection innovations described herein.

A computing environment may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, DVDs, Blu-Ray discs, or any other medium which can be used to store information and which can be accessed within the computing environment 1000. The storage 1040 stores instructions for the software 1080.

The input device(s) 1050 may be a touch input device such as a keyboard, mouse, pen, or trackball, a voice input device, a scanning device, or another device that provides input to the computing environment 1000. For audio or video encoding, the input device(s) 1050 may be a sound card, video card, TV tuner card, or similar device that accepts audio or video input in analog or digital form, or a CD-ROM, CD-RW, DVD-RW, or other device that reads audio or video samples into the computing environment 1000. The output device(s) 1060 may be a display, printer, speaker, CD- or DVD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 1000, computer-readable media include memory 1020 and/or storage.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "transform," and "receive" to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

We claim:

1. One or more computer-readable media containing computer-executable instructions which, when executed by a computer, cause the computer to perform a method for decoding an alpha image encoded in a bit stream, the method comprising:
    entropy decoding encoded data from the bit stream to produce differential residual data for the image, the differential residual data encoded in a modulo domain;
    differential decoding the residual data to produce quantized data for the alpha transparency image, the quantized data represented in a continuous domain; and
    dequantizing the quantized data from the continuous domain to produce reconstructed data for the alpha image such that a quantized data value representing a full encoded alpha image value is dequantized to result in a full reconstructed alpha image value.

2. The method of claim 1, wherein differential decoding the residual data comprises
    differential decoding the residual data in the modulo domain to reconstruct quantized data in the modulo domain; and
    performing a modulo operation on the reconstructed quantized data in the modulo domain to produce quantized data in the continuous domain.

3. A method for encoding an alpha transparency image in a video sequence, the method comprising:
    representing data for the alpha transparency image in a modulo domain;
    transmitting the data in the modulo domain in a video bit stream.

4. The method of claim 3, further comprising quantizing data for the alpha transparency image, and wherein representing data in the modulo domain comprises representing the quantized data in the modulo domain.

5. The method of claim 3, where data for the alpha transparency image is represented in the modulo domain without quantizing, and where alpha transparency data is losslessly encoded in the video sequence.

6. The method of claim 4, wherein representing the quantized data in the modulo domain comprises:

differential encoding the quantized data;
representing the differentially-encoded data into a modulo domain.

7. The method of claim 6, wherein the differentially-encoded data is represented in the modulo domain using a signed modulo operation.

8. The method of claim 6, wherein differential encoding for a quantized data value comprises using a prediction from a value to the left of the quantized value.

9. The method of claim 6, wherein differential encoding for a quantized data value comprises using a prediction from a value to the top of the quantized value.

10. The method of claim 6, wherein differential encoding for a quantized data value comprises using a prediction from values to the left of and to the top of the quantized value.

11. The method of claim 6, further comprising including one or more signals in the video sequence to indicate one or more types of differential encoding rules used for quantized data in the video sequence.

12. A method for decoding an alpha transparency image in a video sequence, the method comprising:
    receiving a video bit stream containing alpha image data in a modulo domain;
    transforming the modulo domain alpha image data into quantized data in a continuous domain; and
    dequantizing the quantized data to produce reconstructed alpha transparency data.

13. The method of claim 12, further comprising entropy decoding encoded data received from the video bit stream.

14. The method of claim 12, wherein the modulo domain alpha image data comprises differential encoded residual data and wherein transforming the modulo domain alpha image data into quantized data comprises differential decoding the residual data.

15. The method of claim 14, wherein differential decoding the residual data comprises:
    differential decoding the residual data to reconstruct quantized data in a modulo domain; and
    performing a modulo operation on the reconstructed quantized data in the modulo domain to produce quantized data in a continuous domain.

16. The method of claim 15, wherein differential decoding residual data comprises one or more of: decoding using a left prediction rule and decoding from a prediction from above rule.

17. The method of claim 15, wherein differential decoding residual data comprises one decoding using a prediction rule which relies on predictions from the left and the top.

18. The method of claim 16, wherein differential decoding rules are used according to codes received in the video bit stream.

19. The method of claim 15, wherein differential decoding is performed in parallel.

20. The method of claim 12, wherein dequantizing the quantized data comprises performing a dequantization operation on the quantized data which maps maximal and minimal quantized data values to maximal and minimal reconstructed alpha image data values, respectively.

* * * * *